US007999976B2

(12) United States Patent
Lee (10) Patent No.: US 7,999,976 B2
(45) Date of Patent: Aug. 16, 2011

(54) AUTOMATIC SHEET-FEEDING SCANNING APPARATUS HAVING MOVABLE GUIDE RIB DEVICE

(75) Inventor: Hsin-Wen Lee, Taipei (TW)

(73) Assignee: Primax Electronics Ltd., Taipei (TW)

( * ) Notice: Subject to any disclaimer, the term of this patent is extended or adjusted under 35 U.S.C. 154(b) by 956 days.

(21) Appl. No.: 11/934,561

(22) Filed: Nov. 2, 2007

(65) Prior Publication Data

US 2008/0304115 A1   Dec. 11, 2008

(30) Foreign Application Priority Data

Jun. 8, 2007  (TW) .............................. 96120661 A (51) Int. Cl.
*H04N 1/04* (2006.01)

(52) U.S. Cl. ........ 358/498; 358/496; 358/497; 358/474; 399/367; 399/380; 399/361

(58) Field of Classification Search .................. 358/497, 358/496, 498, 474, 401, 505, 501; 399/379, 399/380, 367, 211, 215, 361; 271/3.14, 8.1, 271/226
See application file for complete search history.

(56) References Cited

U.S. PATENT DOCUMENTS

| 5,377,966 | A * | 1/1995 | Ohmori | 271/4.01 |
| 7,110,713 | B2 * | 9/2006 | Cheng | 399/367 |
| 7,755,815 | B2 * | 7/2010 | Nakamura et al. | 358/498 |

* cited by examiner

*Primary Examiner* — Cheukfan Lee
(74) *Attorney, Agent, or Firm* — Kirton & McConkie; Evan R. Witt (57) ABSTRACT

The present invention relates to an automatic sheet-feeding scanning apparatus having a movable guide rib device. The automatic sheet-feeding scanning apparatus includes a flatbed scanner and an automatic document feeder. The movable guide rib device is mounted in a housing of the flatbed scanner and includes a guide rib structure, at least one hollow portion, a plurality of elastic members and a fixing plate. The guide rib structure is movable upwardly or downwardly so as to avoid document damage even if the document is relatively large-sized.

15 Claims, 14 Drawing Sheets

AUTOMATIC SHEET-FEEDING SCANNING APPARATUS HAVING MOVABLE GUIDE RIB DEVICE

FIELD OF THE INVENTION

The present invention relates to an automatic sheet-feeding scanning apparatus, and more particularly to an automatic sheet-feeding scanning apparatus having a movable guide rib device.

BACKGROUND OF THE INVENTION

Automatic sheet-feeding scanning apparatuses are widely used to scan images of documents because they can scan many documents at a time. Generally, a typical automatic sheet-feeding scanning apparatus principally includes an automatic paper feeder and a flatbed scanner. The automatic paper feeder is mounted on a glass platform of the sheet-feeding scanner. This automatic sheet-feeding scanning apparatus is capable of scanning a single document in a flatbed scanning mode by placing the document on the glass platform. Alternatively, this automatic sheet-feeding scanning apparatus is capable of successively scanning many documents in a sheet-feeding scanning mode.

Figure 1A:
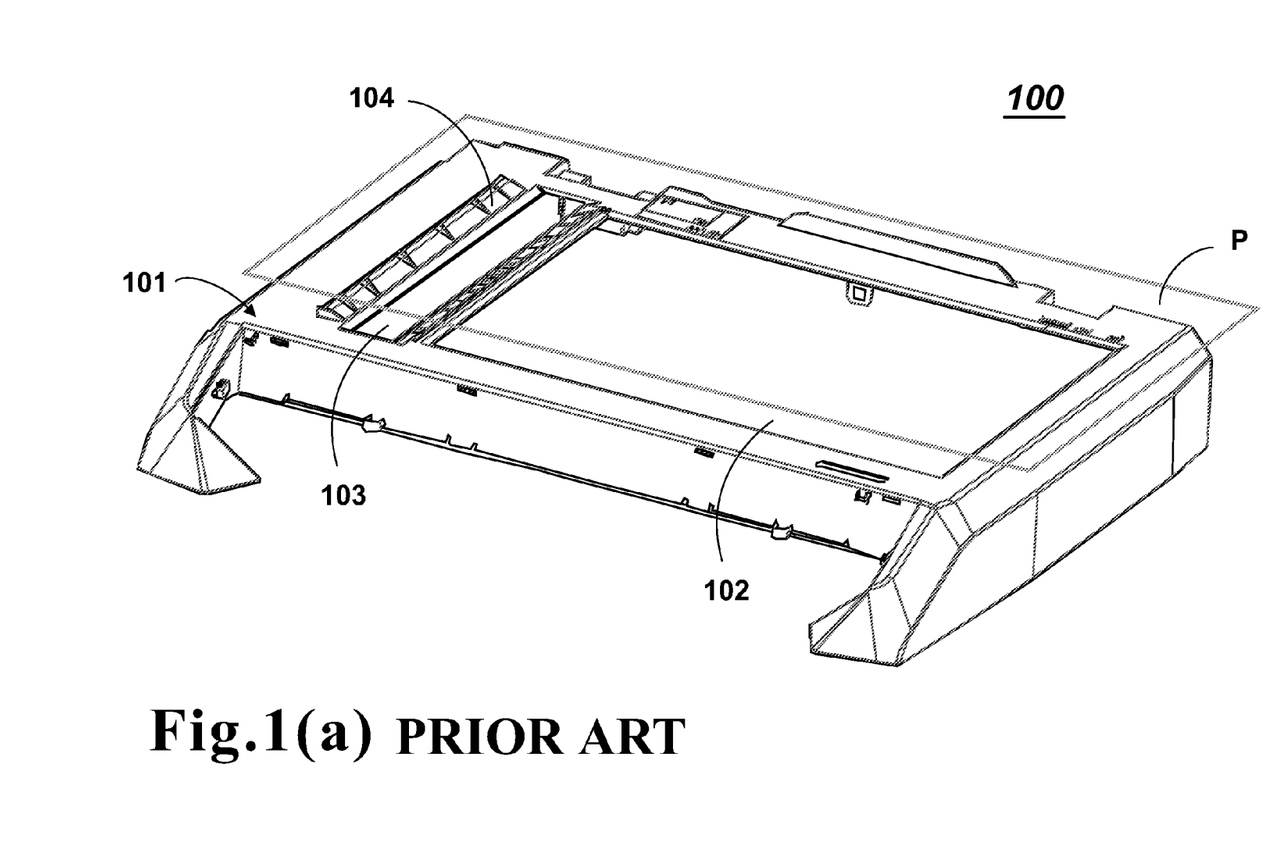
FIGS. 1(a) and 1(b) schematically illustrate a rib structure of an automatic sheet-feeding scanning apparatus according to prior art.

Referring to FIG. 1(a), a schematic perspective view of a conventional automatic sheet-feeding scanning apparatus is illustrated. The automatic sheet-feeding scanning apparatus 100 of FIG. 1(a) principally includes a flatbed scanner 101, a glass platform 102, a scanning window 103 for performing a sheet-feeding scanning operation and a rib structure 104. The rib structure 104 is arranged at a side of the scanning window 103 for guiding the document transported by the automatic paper feeder (not shown) to pass through the scanning window 103 so as to implement the sheet-feeding scanning operation.

Figure 1B:
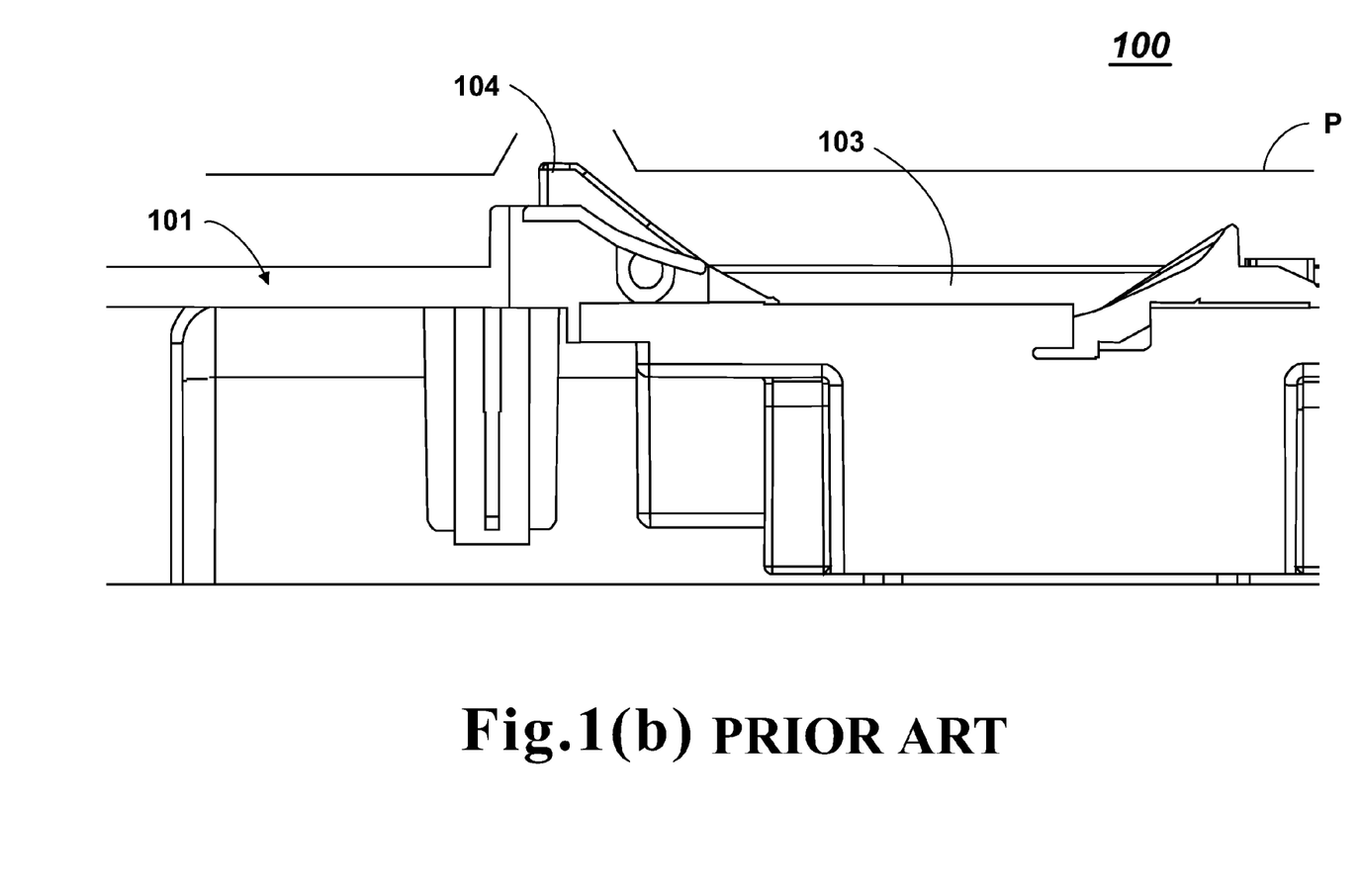

The automatic sheet-feeding scanning apparatus 100, however, still has some drawbacks. For example, in a case that a document P (e.g. a map) having a size greater than the glass platform 102 is placed on the glass platform 102, the rib structure 104 is covered by the document P. For performing a flatbed scanning operation, the automatic paper feeder (not shown) which corresponds to the upper cover of the automatic sheet-feeding scanning apparatus 100 needs to be laid on the glass platform 102. During the automatic paper feeder is laid on the glass platform 102, a downward force is exerted on the document P. Since the rib structure 104 is a salient, the rib structure 104 may pierce through the document P under action of the downward force. Referring to FIG. 1(b), the rib structure 104 causes damage of the document P.

Therefore, there is a need of providing an improved automatic sheet-feeding scanning apparatus to overcome the above-described disadvantages.

SUMMARY OF THE INVENTION

It is an object of the present invention to provide an automatic sheet-feeding scanning apparatus and more particularly to an automatic sheet-feeding scanning apparatus having a movable guide rib device so as to prevent document damage.

In accordance with an aspect of the present invention, there is provided an automatic sheet-feeding scanning apparatus having a movable guide rib device. The automatic sheet-feeding scanning apparatus includes a flatbed scanner and an automatic document feeder. The movable guide rib device is mounted in a housing of the flatbed scanner and includes a guide rib structure, at least one hollow portion, a plurality of elastic members and a fixing plate. The guide rib structure is used for guiding a document transported by the automatic paper feeder to pass through the flatbed scanner. The at least one hollow portion is formed in the housing. The elastic members may facilitate the guide rib structure to move in the hollow portion upwardly or downwardly with respect to the housing. The fixing plate is coupled to the housing for fixing the elastic members thereon.

In an embodiment, the at least one hollow portion includes a single elongated hollow portion, and the guide rib structure includes a guide rib plate and a row of protruded ribs, wherein the protruded ribs are integrally formed on the guide rib plate.

In an embodiment, two fixing rings are respectively arranged on bilateral sides of the guide rib plate and engaged with corresponding protruded posts, which are formed on inner wall of the elongated hollow portion.

In an embodiment, the guide rib structure includes a linking bar and a plurality of protruded ribs coupled to the linking bar, and the at least one hollow portion includes a plurality of hollow portions, wherein each protruded rib is moved upwardly or downwardly in a corresponding hollow portion.

In an embodiment, both ends of the linking bar are engaged with corresponding fastening recesses at bilateral sidewall of the housing. The elastic members are arranged in the vicinity of the both ends of the linking bar and sustained against the fixing plate such that the guide rib structure is moved upwardly or downwardly with respect to the housing.

In an embodiment, the guide rib structure includes a plurality of protruded ribs, and the at least one hollow portion includes a plurality of hollow portions.

In an embodiment, a protruded post is protruded from bilateral sides of each protruded rib. Both ends of the protruded post are engaged with corresponding fastening recesses at bilateral sidewall of each hollow portion. In addition, each protruded rib has a first terminal fixed on the housing and a second terminal sustained against the elastic members to be moved upwardly or downwardly with respect to the housing.

Preferably, the elastic members are springs.

Preferably, the elastic members are resilient sheets.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2A:
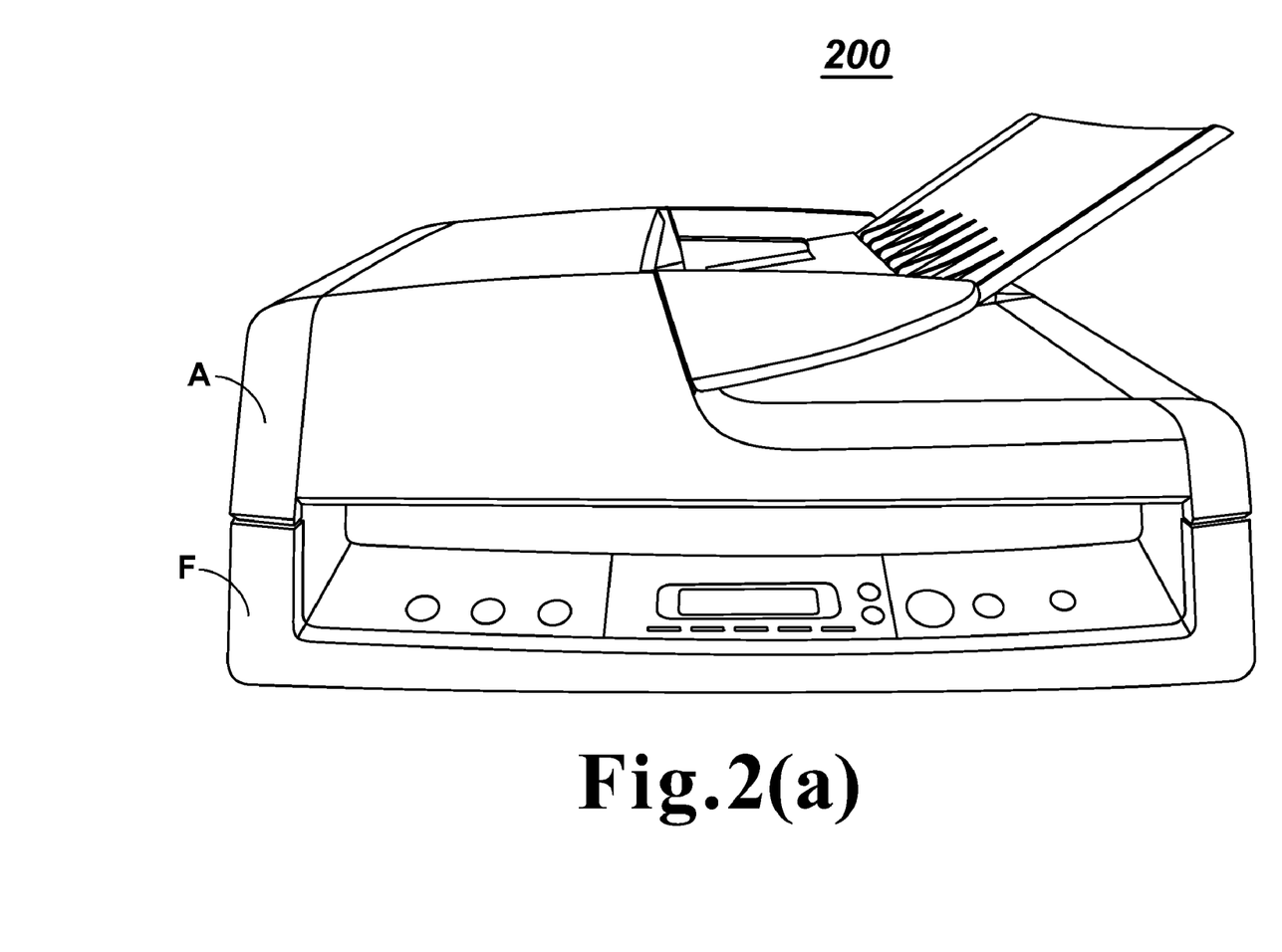
FIG. 2(a) schematically illustrates an automatic sheet-feeding scanning apparatus including a flatbed scanner and an automatic paper feeder.
Figure 2B:
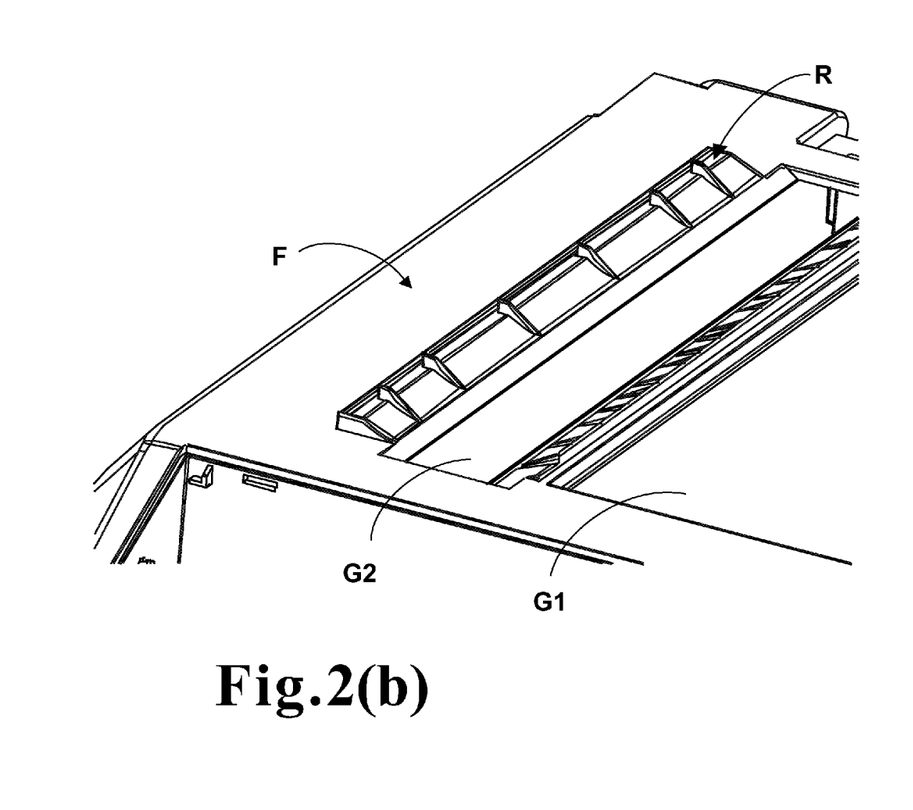
FIG. 2(b) is a schematic partial perspective view of an automatic sheet-feeding scanning apparatus having a movable guide rib device according to the present invention.

Referring to FIG. 2(b), a schematic view of an automatic sheet-feeding scanning apparatus 200 includes a flatbed scanner F and an automatic paper feeder A. Referring to FIG. 2(b), a schematic partial perspective view of an automatic sheet-feeding scanning apparatus having a movable guide rib device according to the present invention is illustrated. The automatic sheet-feeding scanning apparatus of FIG. 2(b) principally includes a flatbed scanner F, a glass platform G1 for performing a flatbed scanning operation, a scanning window G2 for performing a sheet-feeding scanning operation, and a guide rib device R. The guide rib device R is arranged at a side of the scanning window G2. In accordance with a specific feature of the present invention, the guide rib device R is movable in the upward or downward direction. In particular, the guide rib device R is selectively movable depending on the scanning modes of the automatic sheet-feeding scanning apparatus. In a case that the automatic sheet-feeding scanning apparatus F is operated in the sheet-feeding scanning mode, the guide rib device R is not subjected to a downward force and does not move, thereby functioning as the conventional fixed-type rib structure. Consequently, the guide rib device R may facilitate guiding the document transported by the automatic paper feeder A to pass through the scanning window G2. Whereas, in a case that the automatic sheet-feeding scanning apparatus F is operated in the flatbed scanning mode, the guide rib device R is movable when subjected to a downward force. At this moment, the automatic paper feeder A which corresponds to the upper cover of the automatic sheet-feeding scanning apparatus F needs to be laid on the glass platform G1. During the automatic paper feeder is laid on the glass platform G1, a downward force is exerted on the document, such as document P shown in FIG. 1(a). Since the guide rib device R is movable, the guide rib device R will be moved downwardly under the action of the downward force of document P. Under this circumstance, even if the document P has a size greater than the glass platform G1, the document will not be pierced through by the guide rib device R causing damage of the document.

Hereinafter, some exemplary movable guide rib devices for use in automatic sheet-feeding scanning apparatus according to the present invention will be shown with reference to the accompanying drawings.

Referring to FIG. 3, a movable guide rib device according to a first preferred embodiment of the present invention is schematically illustrated. The movable guide rib device of the present invention includes at least a hollow portion, which is open-ended and has no base at the bottom. A fixing plate 205 fixed on the housing of the flatbed scanner is severed as a base of the hollow portion. Furthermore, an elastic member is disposed on the fixing plate to be biased against a protruded rib such that the protruded rib is moved downwardly when a downward force is exerted on the protruded rib or moved upwardly when the downward force is eliminated. The operations of the movable guide rib device will be illustrated as follows.

Figure 3A:
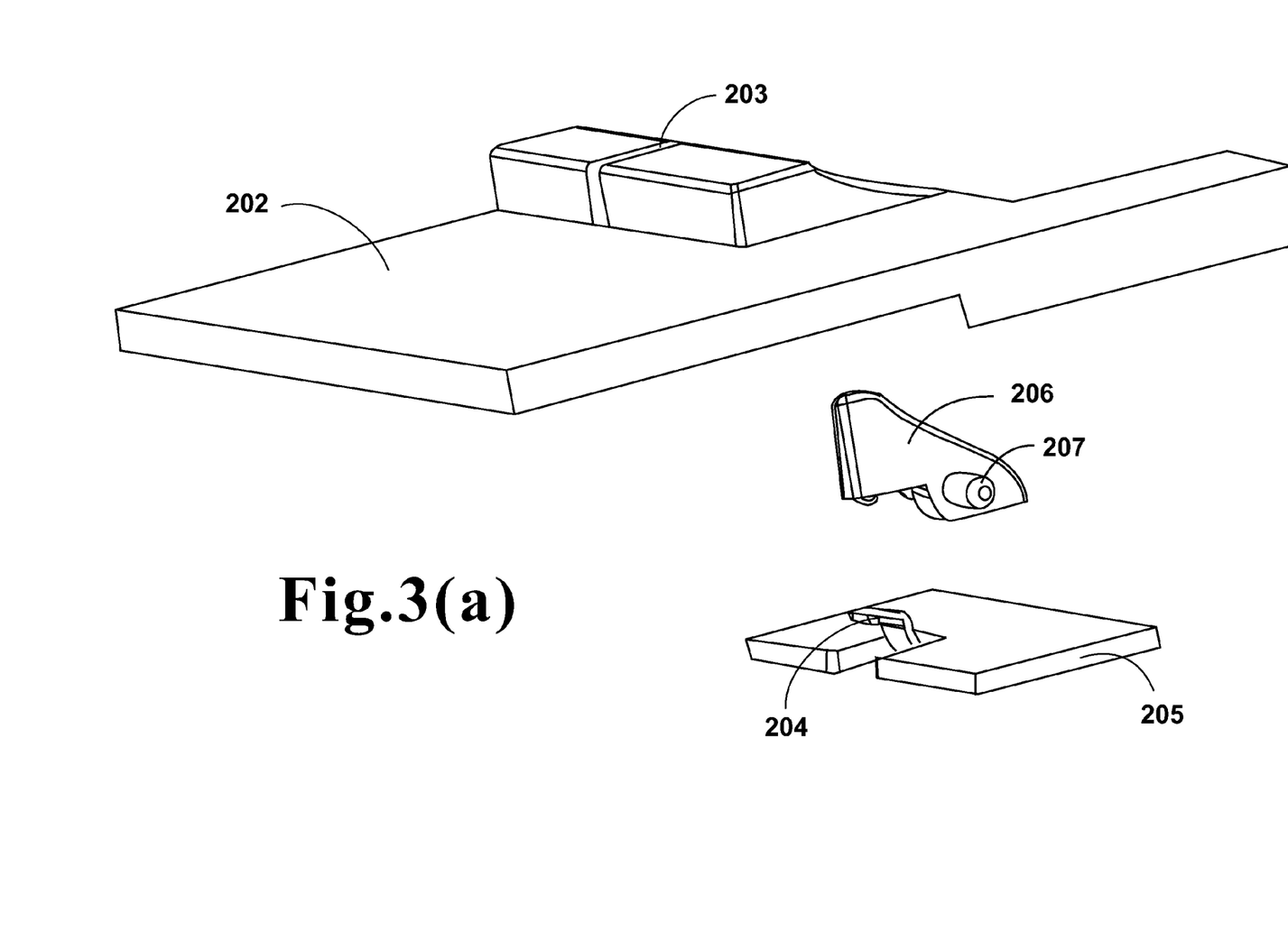
FIGS. 3(a), 3(b), 3(c), 3(d) and 3(e) schematically illustrate a movable guide rib device of an automatic sheet-feeding scanning apparatus according to a first preferred embodiment of the present invention.

FIG. 3(a) is a schematic exploded view illustrating a first elastic member of the movable guide rib device according to the first preferred embodiment of the present invention. The movable guide rib device includes a guide rib structure for guiding the document transported by the automatic paper feeder A to pass through the flatbed scanner so as to implement the sheet-feeding scanning operation. In this embodiment, the guide rib structure includes a plurality of protruded ribs 206. In addition, the movable guide rib device further includes the same number of hollow portions 203 and the same number of first elastic member 204 as the protruded ribs 206. For clarity, only one hollow portion 203 and one first elastic member 204 are shown in the drawings. As shown in FIG. 3(a), the hollow portion 203 is formed in the housing 202 of the flatbed scanner. For each hollow portion 203, a corresponding protruded rib 206 is penetrated through the hollow portion 203. In addition, a protruded post 207 is protruded from bilateral sides of the protruded rib 206. Referring to FIG. 3(e), a schematic bottom assembled view of the housing 202 of the flatbed scanner is illustrated, in which the fixing plate and the first elastic member are not shown. As shown in FIG. 3(e), the both ends of the protruded post 207 are engaged with corresponding fastening recesses 208 at bilateral sidewall of the hollow portion 203.

Figure 3B:
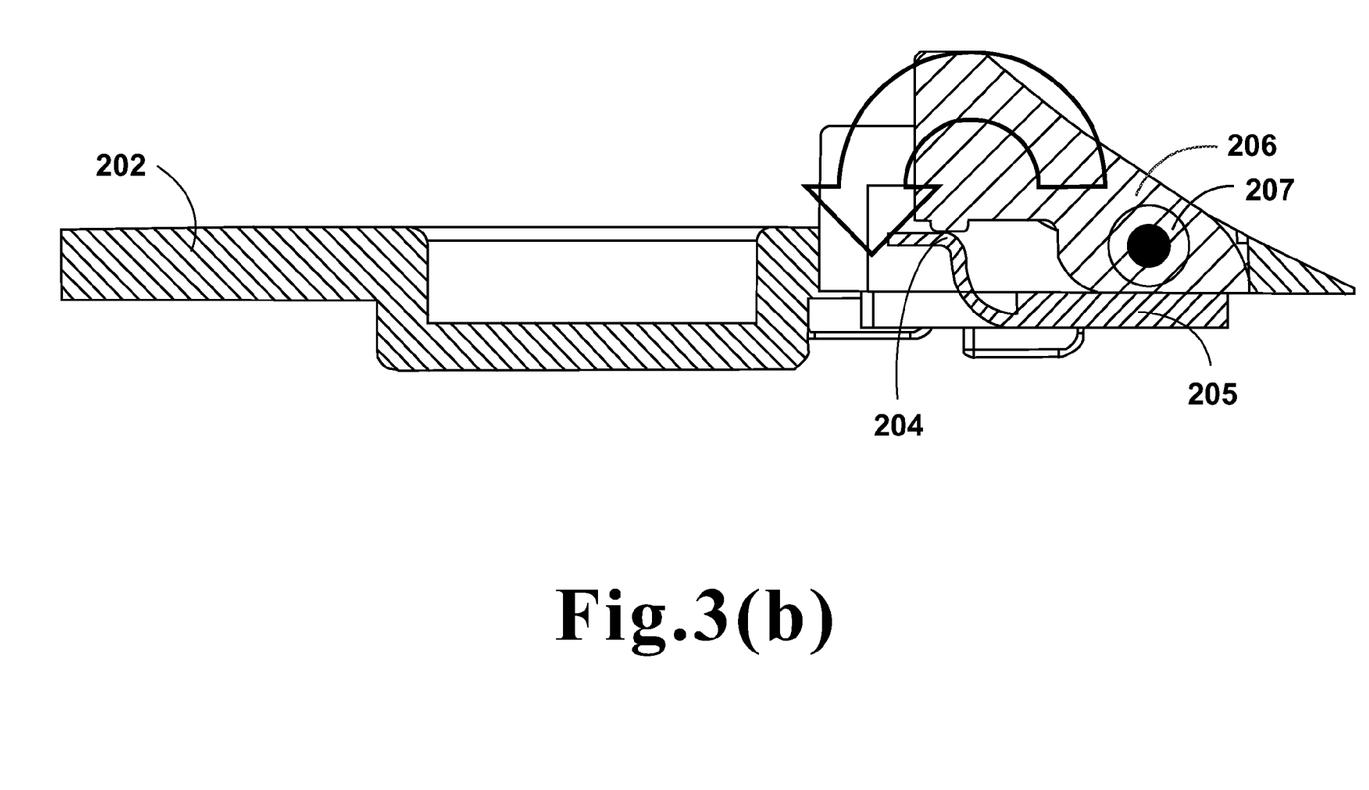

FIG. 3(b) is a schematic cross-sectional view illustrating the assembly of the movable guide rib device in FIG. 3(a). Please refer to FIGS. 3(a) and 3(b). After the both ends of the protruded post 207 are engaged with corresponding fastening recesses 208, a terminal of the protruded rib 206 is fixed on the housing 202. In this embodiment, the first elastic member 204 is a resilient sheet, which is integrally formed with the fixing plate 205. The fixing plate 205 is also attached on the housing 202. The first elastic member 204 is sustained against the other terminal of the protruded rib 206. In response to a downward force exerted on the protruded rib 206, the protruded rib 206 is rotated relative to the protruded post 207 while the fastening recesses 208 serves as fulcrums. Meanwhile, the protruded rib 206 is moved downwardly to suppress the first elastic member 204 until the protruded rib 206 is sunken under the upper aperture of the hollow portion 203. As shown in FIG. 3(b), the protruded rib 206 is rotated in the direction indicated as the arrow.

Figure 3C:
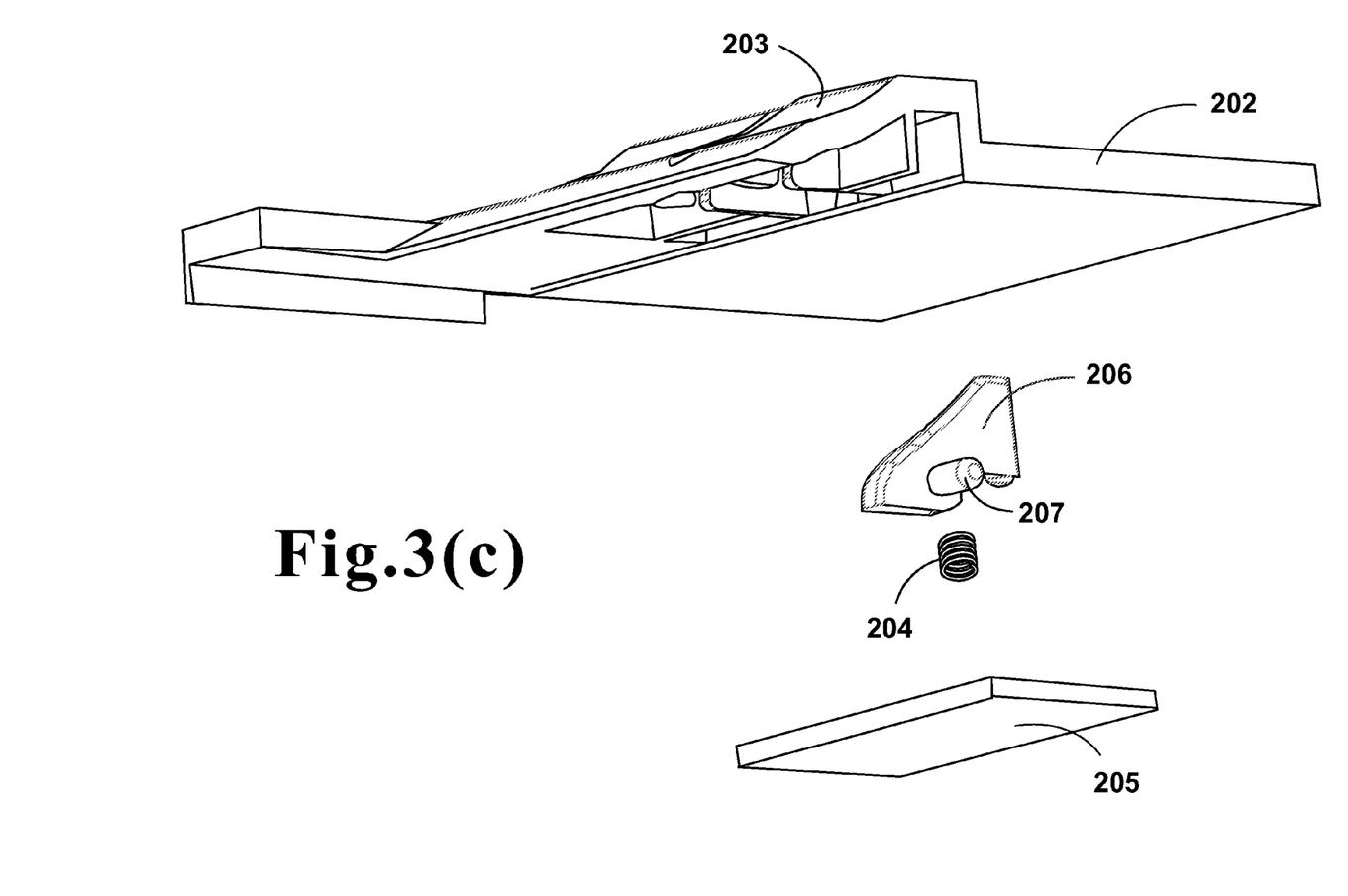
Figure 3D:
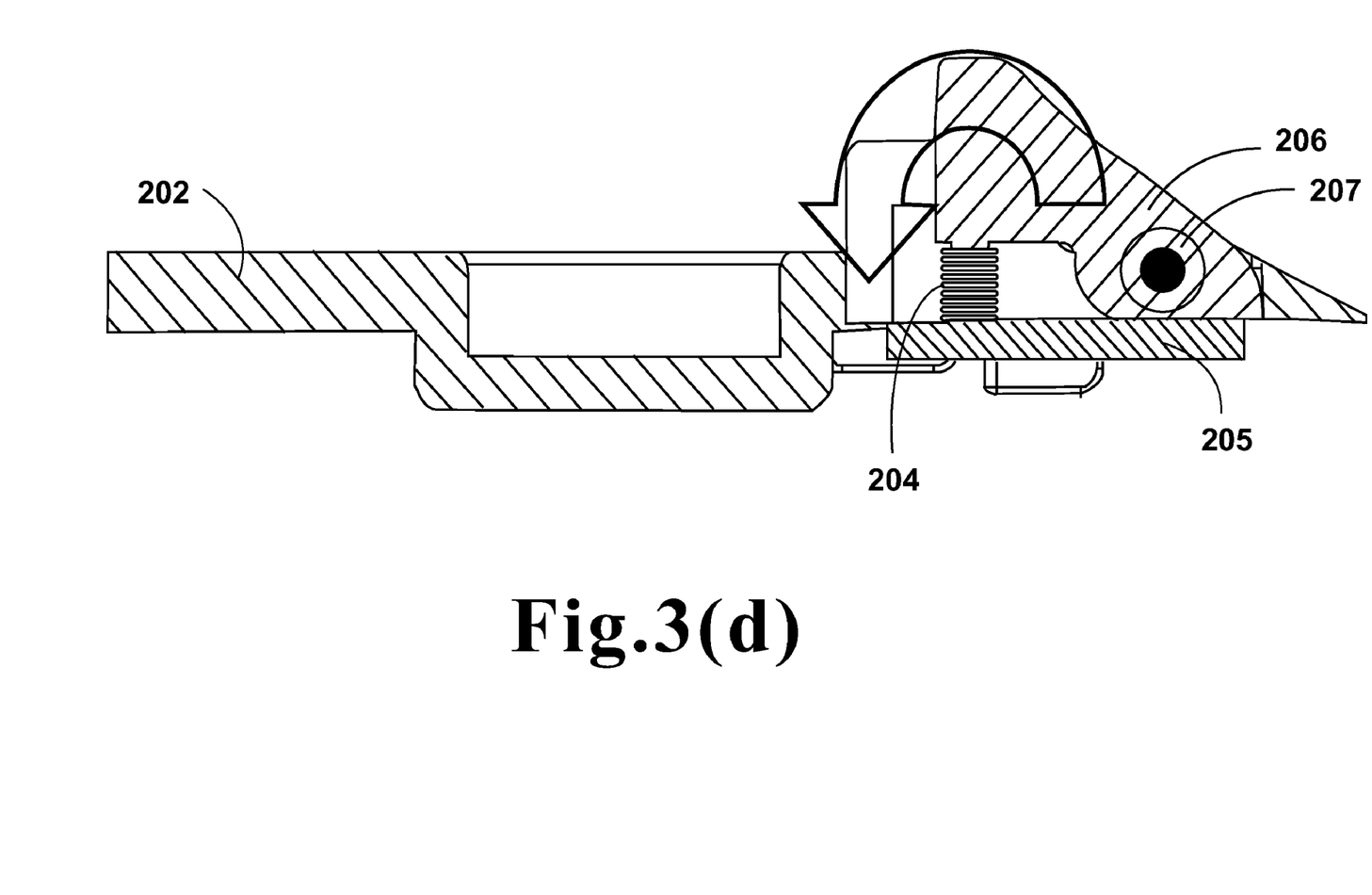
Figure 3E:
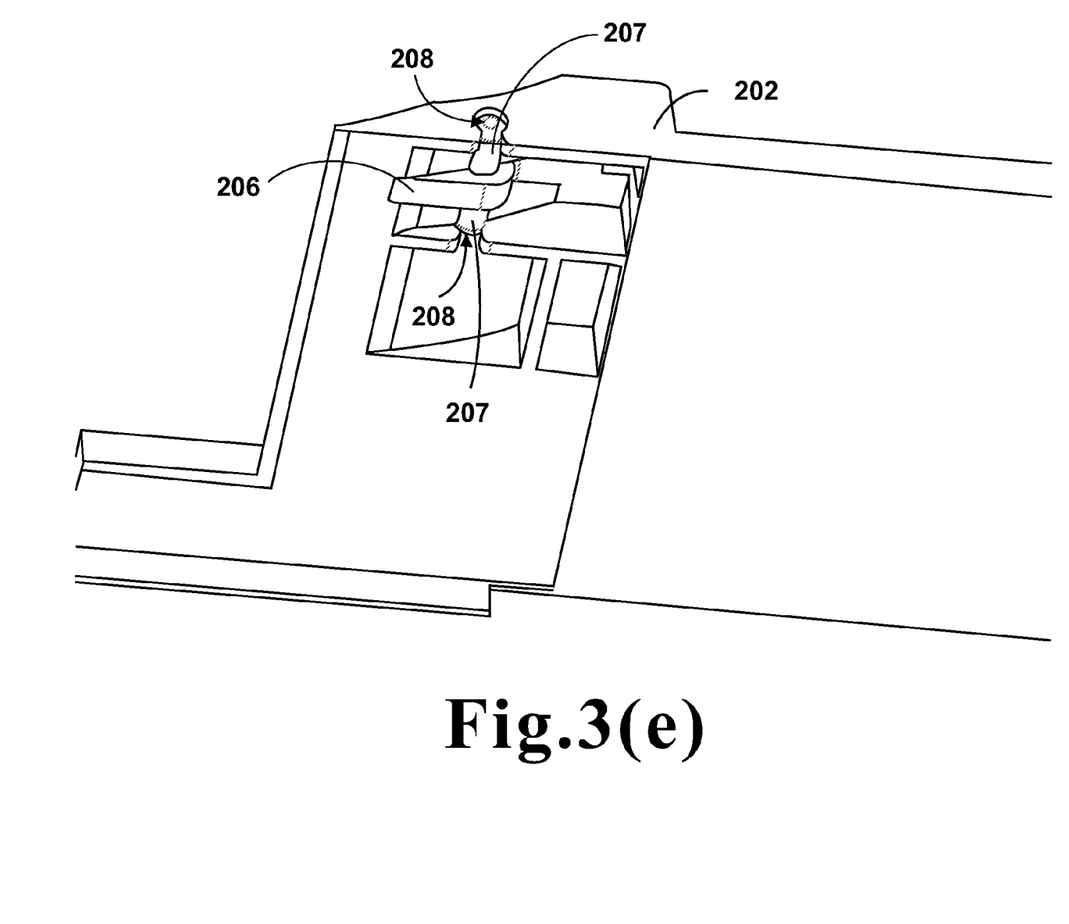

FIGS. 3(c) and 3(d) schematically illustrate a variant of the movable guide rib device according to the first preferred embodiment of the present invention. In this embodiment, the hollow portion 203, the fixing plate 205, the protruded rib 206 and the protruded post 207 included therein are similar to those shown in FIGS. 3(a) and 3(b), and are not redundantly described herein. In addition, the first elastic member is replaced by a second elastic member 204, e.g. a spring. The spring 204 is fixed on the fixing plate 205 but is not integrally formed with the fixing plate 205. Since the operation principle of the second elastic member is similar to that of the first elastic member, the movable guide rib device having the second elastic member is included in the first preferred embodiment of the present invention.

Figure 4A:
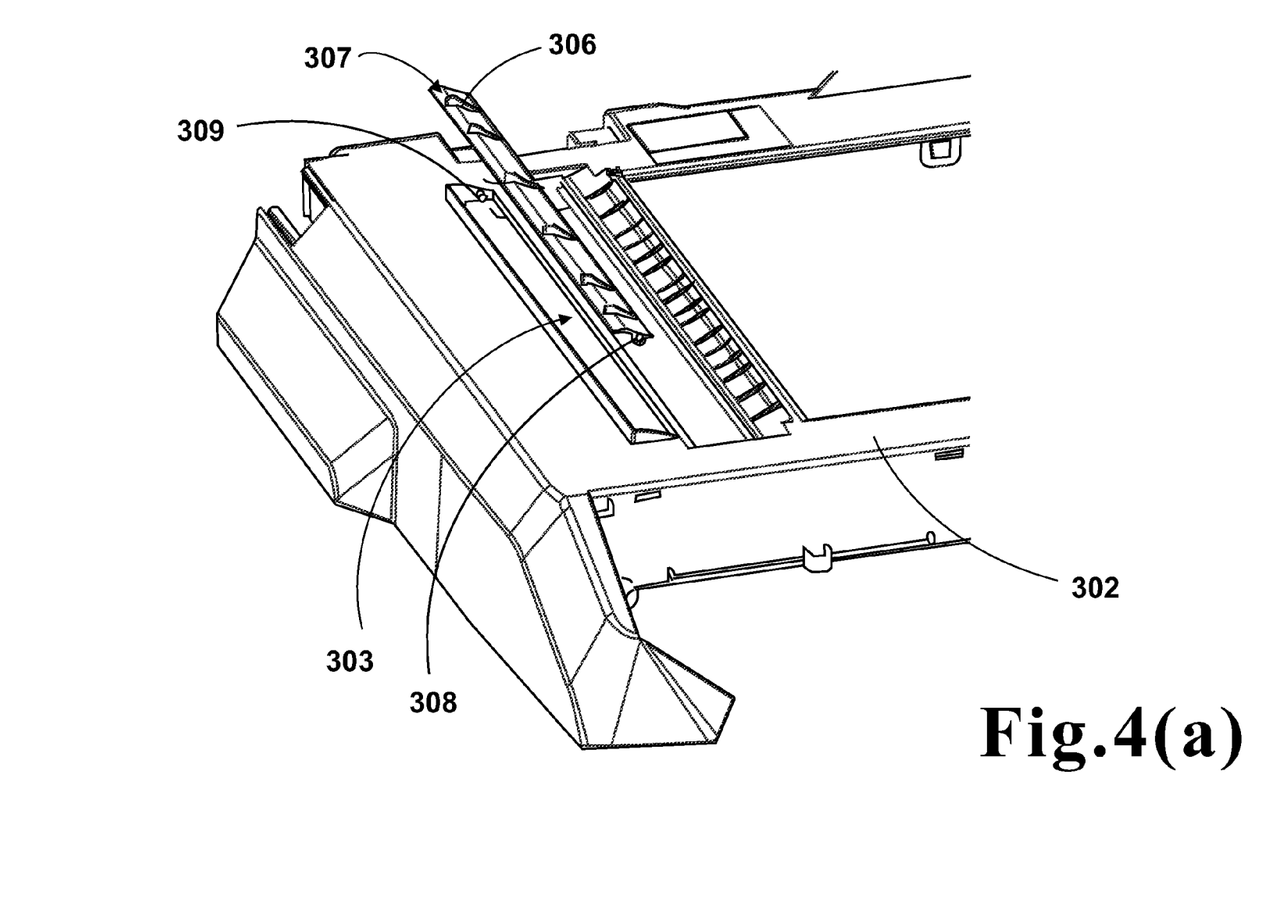
FIGS. 4(a), 4(b) and 4(c) schematically illustrate a movable guide rib device of an automatic sheet-feeding scanning apparatus according to a second preferred embodiment of the present invention.

Referring to FIG. 4, a movable guide rib device according to a second preferred embodiment of the present invention is schematically illustrated. As shown in FIG. 4(a), the guide rib structure of the second preferred embodiment includes a guide rib plate 307. A row of protruded ribs 306 are formed on the guide rib plate 307. Two fixing rings 308 are respectively arranged on bilateral sides of the guide rib plate 307 to be engaged with corresponding protruded posts 309, which are formed on inner wall of an elongated hollow portion 303. Furthermore, a fixing plate 305 is arranged at the bottom of the elongated recess 303 and fixed on the housing 302 of the flatbed scanner. A plurality of elastic members 304 are fixed on the fixing plate 305 and biased against the lower surface of the guide rib plate 307. In response to a downward force exerted on the protruded ribs 306 of the guide rib plate 307, the guide rib plate 307 is rotated relative to the fixing rings 308 while the protruded posts 30 serves as fulcrums. Meanwhile, the guide rib plate 307 is moved downwardly to suppress the elastic member 304.

Figure 4B:
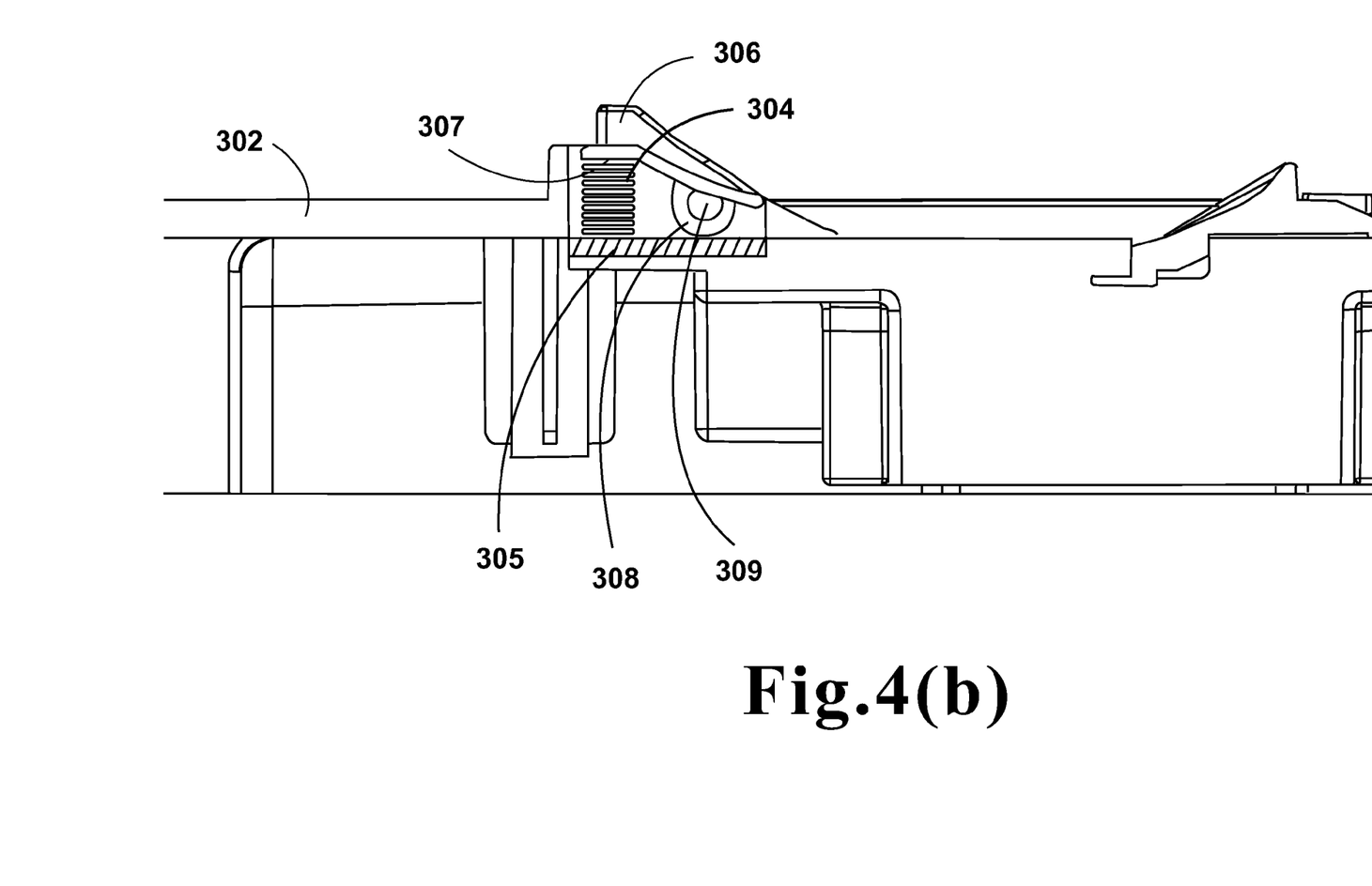
Figure 4C:
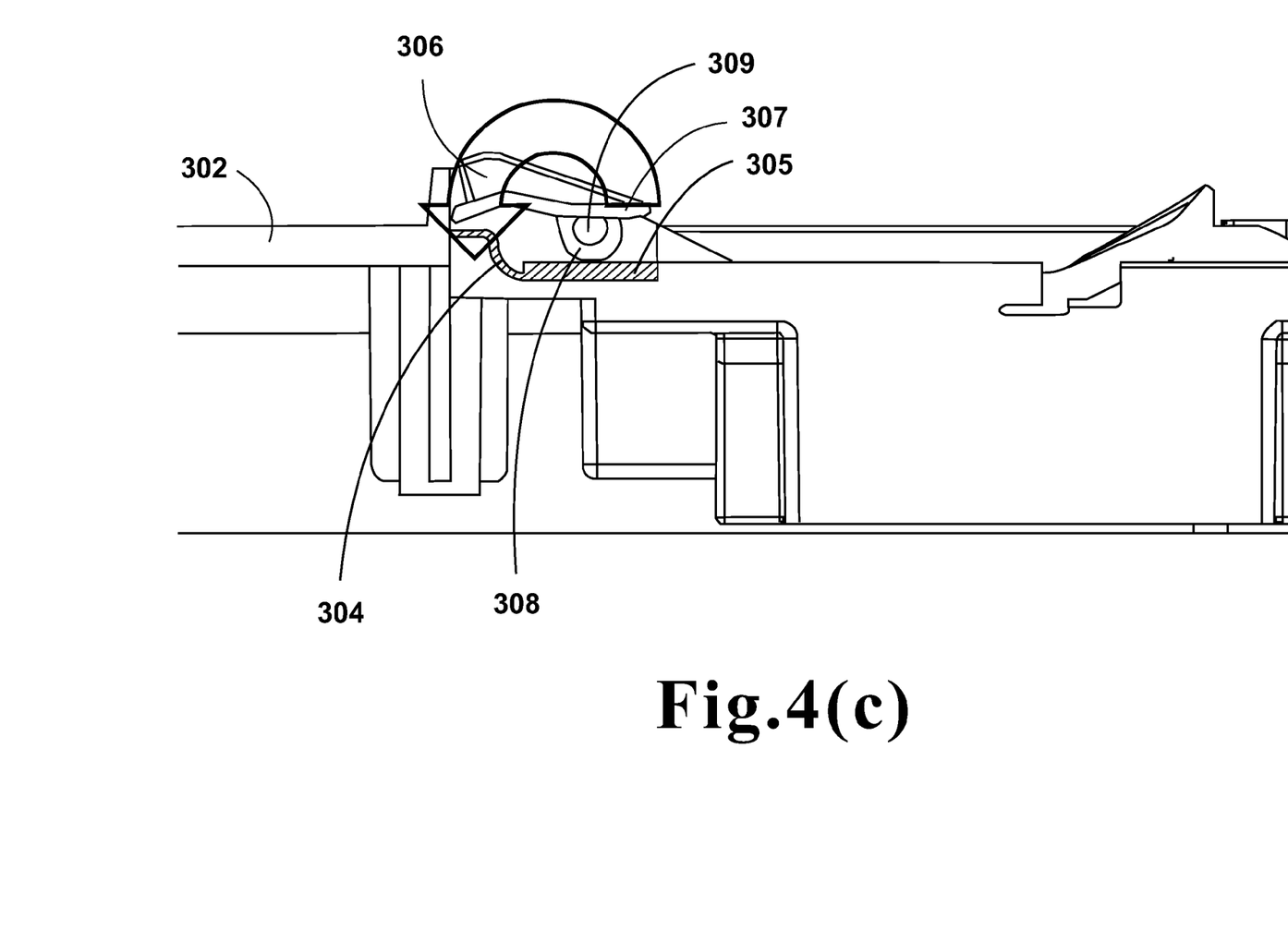

FIG. 4(*b*) is a schematic cross-sectional view illustrating the assembly of the movable guide rib device in FIG. 4(*a*). In this embodiment, the elastic member 304 is a spring. In a case that a document having a size greater than the glass platform of the flatbed scanner is placed on the flatbed scanner for intending to perform a flatbed scanning operation, the automatic paper feeder which corresponds to the upper cover should be laid on the glass platform. During the automatic paper feeder is laid on the glass platform, a downward force is exerted on the protruded ribs 306. In response to the downward force, guide rib plate 307 is rotated downwardly relative to the fixing rings 308 while the protruded posts 30 serves as fulcrums. As shown in FIG. 4(*c*), the guide rib plate 307 is rotated in the direction indicated as the arrow. It is noted that, however, those skilled in the art will readily observe that numerous modifications and alterations of the elastic member 304 may be made while retaining the teachings of the invention. For example, a spring as shown in FIG. 4(*a*) or a resilient sheet as shown in FIG. 4(*b*) may be used as the elastic member 304. In a case that the resilient sheet is used as the elastic member 304, the resilient sheet may be integrally formed on the fixing plate 305.

Figure 5A:
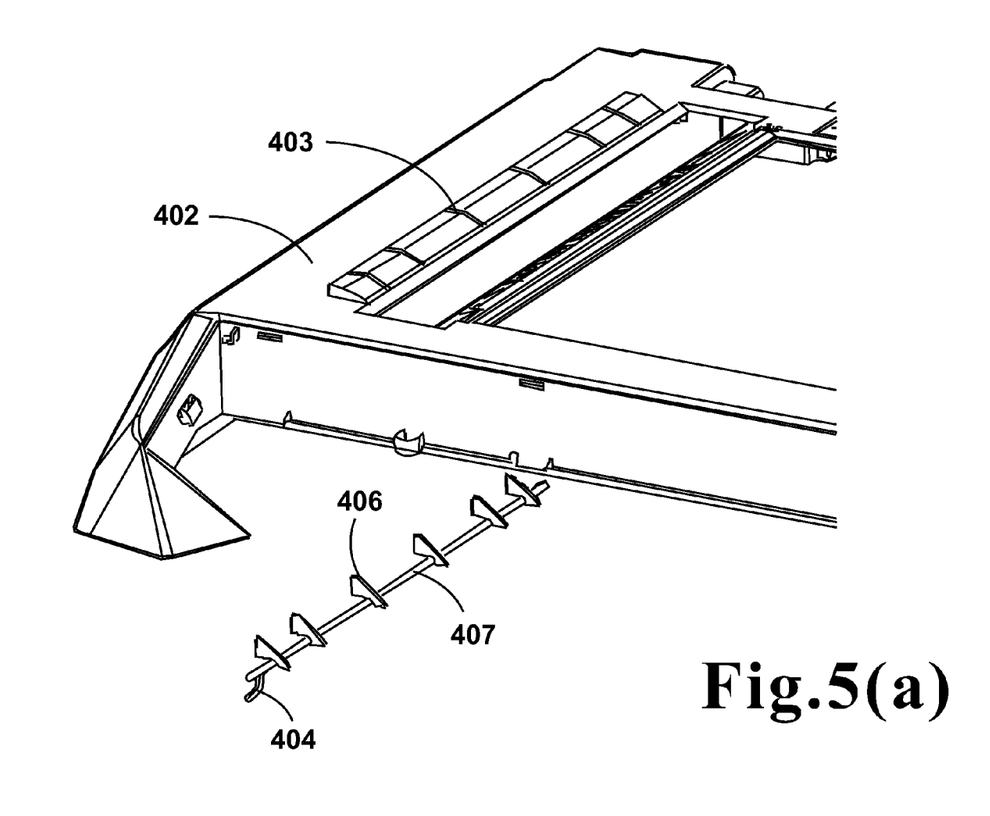
FIGS. 5(a) and 5(b) schematically illustrate a movable guide rib device of an automatic sheet-feeding scanning apparatus according to a third preferred embodiment of the present invention.
Figure 5B:
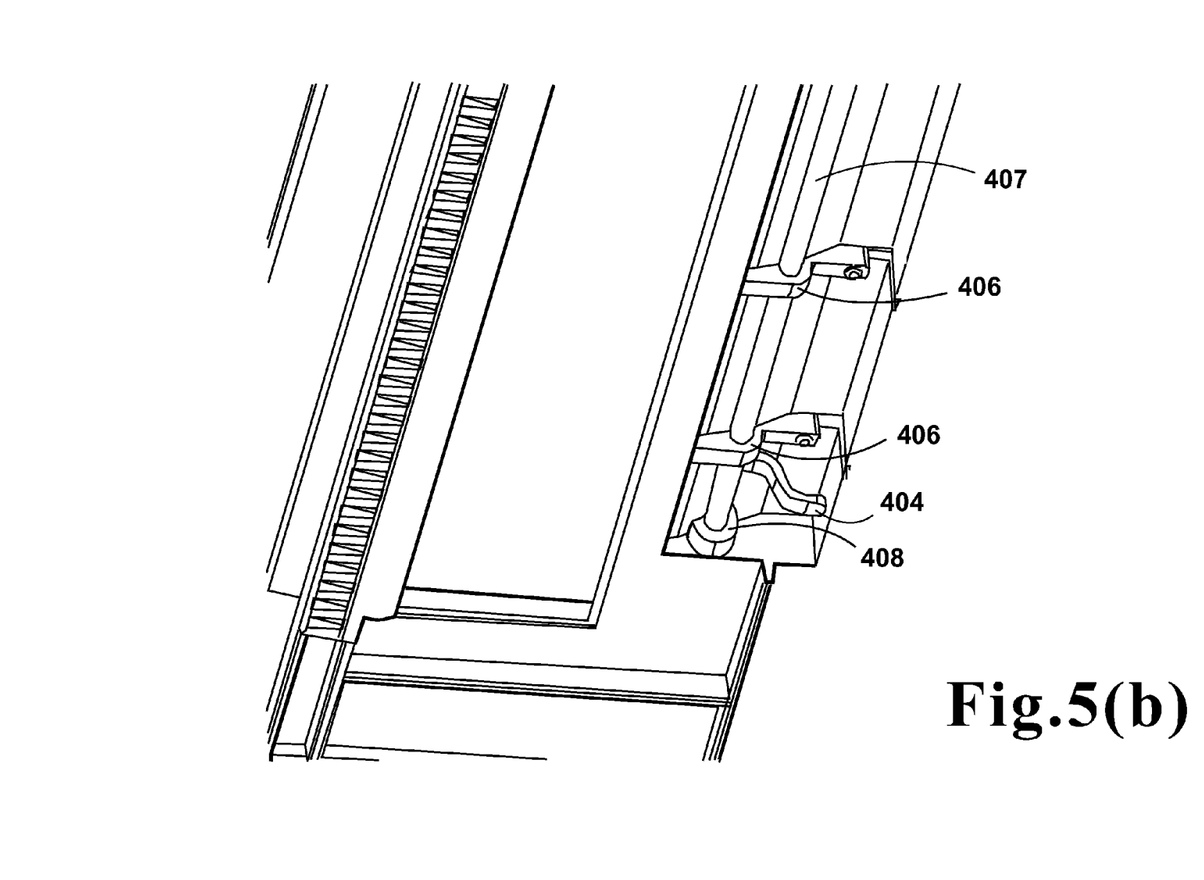

Referring to FIG. 5, a movable guide rib device according to a third preferred embodiment of the present invention is schematically illustrated. As shown in FIG. 5(*a*), the movable guide rib device of the third preferred embodiment includes a linking bar 407 and a plurality of protruded ribs 406. The protruded ribs 406 are coupled to the linking bar 407. In addition, the movable guide rib device further includes the same number of hollow portions 403 as the protruded ribs 406. For each hollow portion 403, a corresponding protruded rib 406 is penetrated through the hollow portion 403. Referring to FIG. 5(*b*), a schematic bottom assembled view of the housing 402 of the flatbed scanner is illustrated, in which the fixing plate is not shown. As shown in FIG. 5(*b*), the both ends of the linking bar 407 are engaged with corresponding fastening recesses 408 at bilateral sidewall of the housing 402 under the hollow portions 403. As a consequence, the linking bar 407 is received within and fixed in the housing 402, as is also shown in FIG. 5(*b*).

Similarly, in a case that a document having a size greater than the glass platform of the flatbed scanner is placed on the flatbed scanner for intending to perform a flatbed scanning operation, the automatic paper feeder which corresponds to the upper cover should be laid on the glass platform. During the automatic paper feeder is laid on the glass platform, a downward force is exerted on the protruded ribs 406 and thus the elastic members 404 are compressed. Correspondingly, the linking bar 407 is rotated relative to the fastening recesses 408 such that the protruded ribs 406 are moved downwardly to suppress the elastic members 404.

In the third preferred embodiment, exemplary elastic members 404 are resilient sheets or springs. In a case that the resilient sheets is used as the elastic members 404, the resilient sheets may be integrally formed on the linking bar 407 and biased against a fixing plate (not shown), which is coupled to the housing 402. In other words, unlike the first and second embodiments, the resilient sheets are not integrally formed on the fixing plate. In a case that the springs is used as the elastic members 404, the springs are fixed on the fixing plate and biased against the linking bar 407 such that the protruded ribs 406 are moved upwardly or downwardly with the linking bar 407.

From the above description, it is found that the movable guide rib device of the present invention may correspond to the upper cover of the typical flatbed scanner. Since the movable guide rib device is moved upwardly or downwardly depending on the scanning modes, the movable guide rib device will no long pierce through the document even if the document has a size greater than the glass platform. As a consequence, the problem of causing damage of the document by the guide rib structure is avoided. Furthermore, the movable guide rib device of the present invention cost-effective because it is simply in structure. In the even of a breakdown, the movable guide rib device may be repaired or replaced with difficulty.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic sheet-feeding scanning apparatus having a movable guide rib device, said automatic sheet-feeding scanning apparatus including a flatbed scanner and an automatic document feeder, said movable guide rib device being mounted in a housing of said flatbed scanner and comprising:
   a guide rib structure for guiding a document transported by said automatic paper feeder to pass through said flatbed scanner, wherein said guide rib structure includes a linking bar;
   at least one hollow portion formed in said housing;
   a plurality of elastic members for facilitating said guide rib structure to move in said hollow portion upwardly or downwardly with respect to said housing; and
   a fixing plate coupled to said housing for fixing said elastic members thereon,
   wherein both ends of said linking bar are engaged with corresponding fastening recesses at bilateral sidewall of said housing, and said elastic members are arranged in the vicinity of said both ends of said linking bar and sustained against said fixing plate such that said guide rib structure is moved upwardly or downwardly with respect to said housing.

2. The automatic sheet-feeding scanning apparatus having a movable guide rib device according to claim 1 wherein said at least one hollow portion includes a single elongated hollow portion, and said guide rib structure includes a guide rib plate and a row of protruded ribs, wherein said protruded ribs are integrally formed on said guide rib plate.

3. The automatic sheet-feeding scanning apparatus having a movable guide rib device according to claim 2 wherein two fixing rings are respectively arranged on bilateral sides of said guide rib plate and engaged with corresponding protruded posts, which are formed on inner walls of said elongated hollow portion.

4. The automatic sheet-feeding scanning apparatus having a movable guide rib device according to claim 1 wherein said guide rib structure includes a plurality of protruded ribs coupled to said linking bar, and said at least one hollow portion includes a plurality of hollow portions, wherein each protruded rib is moved upwardly or downwardly in a corresponding hollow portion.

5. The automatic sheet-feeding scanning apparatus having a movable guide rib device according to claim 1 wherein said guide rib structure includes a plurality of protruded ribs, and said at least one hollow portion includes a plurality of hollow portions.

6. The automatic sheet-feeding scanning apparatus having a movable guide rib device according to claim 5 wherein a protruded post is protruded from bilateral sides of each protruded rib, both ends of said protruded post are engaged with corresponding fastening recesses at bilateral sidewall of each hollow portion, and each protruded rib has a first terminal fixed on said housing and a second terminal sustained against said elastic members to be moved upwardly or downwardly with respect to said housing.

7. The automatic sheet-feeding scanning apparatus having a movable guide rib device according to claim 1 wherein said elastic members are springs.

8. The automatic sheet-feeding scanning apparatus having a movable guide rib device according to claim 1 wherein said elastic members are resilient sheets.

9. An automatic sheet-feeding scanning apparatus having a movable guide rib device, said automatic sheet-feeding scanning apparatus including a flatbed scanner and an automatic document feeder, said movable guide rib device being mounted in a housing of said flatbed scanner and comprising:
a guide rib structure for guiding a document transported by said automatic paper feeder to pass through said flatbed scanner, wherein said guide rib structure includes a plurality of protruded ribs, wherein a protruded post is protruded from bilateral sides of each protruded rib and both ends of said protruded post are engaged with corresponding fastening recesses at a bilateral sidewall of each hollow portion;
at least one hollow portion formed in said housing, said at least one hollow portion includes a plurality of hollow portions;
a plurality of elastic members for facilitating said guide rib structure to move in said hollow portion upwardly or downwardly with respect to said housing, wherein each protruded rib has a first terminal fixed on said housing and a second terminal sustained against said elastic members to be moved upwardly or downwardly with respect to said housing; and
a fixing plate coupled to said housing for fixing said elastic members thereon.

10. The automatic sheet-feeding scanning apparatus having a movable guide rib device according to claim 9 wherein said at least one hollow portion includes a single elongated hollow portion, and said guide rib structure includes a guide rib plate and a row of protruded ribs, wherein said protruded ribs are integrally formed on said guide rib plate.

11. The automatic sheet-feeding scanning apparatus having a movable guide rib device according to claim 10 wherein two fixing rings are respectively arranged on bilateral sides of said guide rib plate and engaged with corresponding protruded posts, which are formed on inner wall of said elongated hollow portion.

12. The automatic sheet-feeding scanning apparatus having a movable guide rib device according to claim 9 wherein said guide rib structure includes a linking bar and a plurality of protruded ribs coupled to said linking bar, and said at least one hollow portion includes a plurality of hollow portions, wherein each protruded rib is moved upwardly or downwardly in a corresponding hollow portion.

13. The automatic sheet-feeding scanning apparatus having a movable guide rib device according to claim 12 wherein both ends of said linking bar are engaged with corresponding fastening recesses at bilateral sidewall of said housing, and said elastic members are arranged in the vicinity of said both ends of said linking bar and sustained against said fixing plate such that said guide rib structure is moved upwardly or downwardly with respect to said housing.

14. The automatic sheet-feeding scanning apparatus having a movable guide rib device according to claim 9 wherein said elastic members are springs.

15. The automatic sheet-feeding scanning apparatus having a movable guide rib device according to claim 9 wherein said elastic members are resilient sheets.

* * * * *